(12) United States Patent
Smith et al.

(10) Patent No.: US 11,126,953 B2
(45) Date of Patent: Sep. 21, 2021

(54) SYSTEMS AND METHODS FOR AUTOMATICALLY INVOKING A DELIVERY REQUEST FOR AN IN-PROGRESS ORDER

(71) Applicant: WAL-MART STORES, INC., Bentonville, AR (US)

(72) Inventors: Austin Lee Smith, Burlingame, CA (US); Deepak Deshpande, San Jose, CA (US); Vidyanand Krishnan, Sunnyvale, CA (US); Michael Gilbert Ebener, San Francisco, CA (US); Arnon Katz, San Mateo, CA (US); Prakash Seetharaman, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 301 days.

(21) Appl. No.: 15/623,153

(22) Filed: Jun. 14, 2017

(65) Prior Publication Data

US 2018/0365637 A1 Dec. 20, 2018

(51) Int. Cl.
  *G06Q 10/06* (2012.01)
  *G06Q 30/06* (2012.01)
  *G06Q 10/08* (2012.01)

(52) U.S. Cl.
  CPC ....... *G06Q 10/0834* (2013.01); *G06Q 10/067* (2013.01); *G06Q 10/063114* (2013.01); *G06Q 10/0833* (2013.01); *G06Q 30/0635* (2013.01)

(58) Field of Classification Search
  CPC ....... G06Q 10/063114; G06Q 10/0833; G06Q 10/0834; G06Q 30/0635
  See application file for complete search history.

(56) References Cited

U.S. PATENT DOCUMENTS 6,246,998 B1 6/2001 Matsumori
7,147,154 B2 12/2006 Myers et al.
(Continued)

FOREIGN PATENT DOCUMENTS

CN 101778045 A 7/2010
CN 101964799 A 2/2011
(Continued)

OTHER PUBLICATIONS

Fulton, Rick, Estimating Delivery Times: A Case Study In Practical Machine Learning, Postmates Blog, Oct. 23, 2015.*
(Continued)

*Primary Examiner* — Renae Feacher
(74) *Attorney, Agent, or Firm* — Bryan Cave Leighton Paisner, LLP (57) ABSTRACT

Systems and methods including one or more processing modules and one or more non-transitory storage modules storing computing instructions configured to run on the one or more processing modules and perform acts of receiving an order request from a customer, transmitting an order list from the order request to an employee of the store for a collection of products on the order list at the store by the employee, determining an estimated order collection time, continuously monitoring an estimated order pickup time for a delivery driver of a third-party delivery service, and, when the estimated order pickup time for the delivery driver is substantially equal to the estimated order collection time, transmitting a delivery request to the third-party delivery service requesting the delivery driver to pick up the products from the store and deliver the products to the delivery address.

20 Claims, 5 Drawing Sheets

(56) References Cited

U.S. PATENT DOCUMENTS

| | | |
|---|---|---|
| 7,295,990 B1 | 11/2007 | Braumoeller et al. |
| 7,747,543 B1 | 6/2010 | Braumoeller et al. |
| 7,949,686 B2 | 5/2011 | Chang et al. |
| 8,005,761 B1 | 8/2011 | Braumoeller et al. |
| 8,121,876 B1 | 2/2012 | Braumoeller et al. |
| 8,201,737 B1 | 6/2012 | Palacios Durazo et al. |
| 8,401,914 B1 | 3/2013 | Kim |
| 8,428,988 B1 | 4/2013 | Braumoeller et al. |
| 8,818,836 B1 | 8/2014 | Braumoeller et al. |
| 9,147,208 B1 | 9/2015 | Argue et al. |
| 9,466,045 B1 | 10/2016 | Kumar |
| 9,470,532 B2 | 10/2016 | Pellow et al. |
| 9,626,709 B2 | 4/2017 | Koch et al. |
| 10,127,514 B2 | 11/2018 | Napoli |
| 2002/0198756 A1 | 12/2002 | Ghaisas et al. |
| 2003/0033177 A1 | 2/2003 | MacGonigle et al. |
| 2003/0177072 A1 | 9/2003 | Bared |
| 2004/0010437 A1 | 1/2004 | Kiran et al. |
| 2004/0068443 A1 | 4/2004 | Hopson et al. |
| 2004/0210621 A1* | 10/2004 | Antonellis ........... G06Q 10/087 709/200 |
| 2005/0278062 A1 | 12/2005 | Janert et al. |
| 2007/0174144 A1 | 7/2007 | Borders et al. |
| 2007/0244758 A1 | 10/2007 | Xie |
| 2007/0250355 A1 | 10/2007 | Leet et al. |
| 2009/0048878 A1 | 2/2009 | Metcalf |
| 2009/0157472 A1 | 6/2009 | Burazin et al. |
| 2009/0281921 A1 | 11/2009 | Foster et al. |
| 2010/0010902 A1 | 1/2010 | Casey |
| 2010/0287025 A1 | 11/2010 | Fletcher et al. |
| 2012/0023034 A1 | 1/2012 | Lynch et al. |
| 2012/0123674 A1 | 5/2012 | Perks et al. |
| 2012/0150340 A1 | 6/2012 | Suess et al. |
| 2012/0173449 A1* | 7/2012 | Waddington ........ G06F 16/9574 705/338 |
| 2012/0330458 A1 | 12/2012 | Weiss |
| 2013/0030955 A1 | 1/2013 | David |
| 2013/0231990 A1 | 9/2013 | Munjal et al. |
| 2013/0332273 A1 | 12/2013 | Gu et al. |
| 2013/0346204 A1 | 12/2013 | Wissner-Gross et al. |
| 2014/0003727 A1 | 1/2014 | Lortz et al. |
| 2014/0040075 A1 | 2/2014 | Perry et al. |
| 2014/0095350 A1 | 4/2014 | Carr et al. |
| 2014/0136255 A1 | 5/2014 | Grabovski et al. |
| 2014/0156553 A1 | 6/2014 | Leach et al. |
| 2014/0207615 A1 | 7/2014 | Li et al. |
| 2014/0266616 A1 | 9/2014 | Jones et al. |
| 2014/0278627 A1 | 9/2014 | Grabovski et al. |
| 2014/0279294 A1 | 9/2014 | Field-Darragh |
| 2014/0324491 A1 | 10/2014 | Banks et al. |
| 2014/0336814 A1 | 11/2014 | Moore et al. |
| 2014/0351101 A1 | 11/2014 | Danelski |
| 2014/0379529 A1 | 12/2014 | Agasti et al. |
| 2015/0051994 A1 | 2/2015 | Ward et al. |
| 2015/0170256 A1 | 6/2015 | Pettyjohn |
| 2015/0206093 A1 | 7/2015 | Trew et al. |
| 2015/0242918 A1 | 8/2015 | McCarthy |
| 2015/0278759 A1* | 10/2015 | Harris .................. H04W 4/024 705/338 |
| 2015/0310447 A1 | 10/2015 | Shaw |
| 2016/0012391 A1* | 1/2016 | Burnett ............... G06F 3/04842 705/336 |
| 2016/0055452 A1 | 2/2016 | Qin |
| 2016/0063604 A1 | 3/2016 | Shaffer et al. |
| 2016/0071056 A1* | 3/2016 | Ellison ............ G06Q 10/08355 705/338 |
| 2016/0092969 A1 | 3/2016 | Gopalsamy et al. |
| 2016/0148300 A1 | 5/2016 | Carr et al. |
| 2016/0171592 A1 | 6/2016 | Pugh et al. |
| 2016/0203543 A1 | 7/2016 | Snow |
| 2016/0223339 A1 | 8/2016 | Pellow et al. |
| 2016/0247113 A1* | 8/2016 | Rademaker .... G06Q 10/063114 |
| 2016/0253740 A1 | 9/2016 | Goulart |
| 2016/0258762 A1 | 9/2016 | Taylor et al. |
| 2016/0260158 A1* | 9/2016 | High ..................... B66F 9/063 |
| 2016/0299782 A1 | 10/2016 | Jones et al. |
| 2016/0314335 A1* | 10/2016 | Al-Kofahi ............ G06K 9/0014 |
| 2016/0314429 A1 | 10/2016 | Gillen et al. |
| 2016/0321605 A1 | 11/2016 | Maifeld et al. |
| 2016/0350837 A1 | 12/2016 | Williams et al. |
| 2017/0024789 A1 | 1/2017 | Frehn et al. |
| 2017/0069013 A1 | 3/2017 | Castillo |
| 2017/0200108 A1 | 7/2017 | Au et al. |
| 2017/0213186 A1 | 7/2017 | Grifoni |
| 2017/0228701 A1 | 8/2017 | Wosk et al. |
| 2017/0278047 A1 | 9/2017 | Welty et al. |
| 2017/0285648 A1 | 10/2017 | Welty et al. |
| 2017/0369245 A1 | 12/2017 | Suemitsu et al. |
| 2018/0075404 A1* | 3/2018 | Hendrickson .......... G06Q 50/04 |
| 2018/0121992 A1 | 5/2018 | Agarwal et al. |
| 2018/0137452 A1 | 5/2018 | Khartravath et al. |
| 2018/0182054 A1 | 6/2018 | Yao et al. |
| 2018/0307998 A1* | 10/2018 | Strachan .................. G06N 7/005 |
| 2018/0314991 A1 | 11/2018 | Grundberg |
| 2018/0342031 A1 | 11/2018 | Tada et al. |

FOREIGN PATENT DOCUMENTS

| | | |
|---|---|---|
| CN | 102137100 A | 7/2011 |
| CN | 102377629 A | 3/2012 |
| DE | 102012100354 | 7/2013 |
| WO | 2016119747 A1 | 8/2016 |
| WO | 2016119749 | 8/2016 |

OTHER PUBLICATIONS

Pingulkar et al., "Picking productivity estimation in distribution warehouses," Feb. 25, 2015.*

U.S. Appl. No. 15/339,808, filed Oct. 31, 2016.

\* cited by examiner

SYSTEMS AND METHODS FOR AUTOMATICALLY INVOKING A DELIVERY REQUEST FOR AN IN-PROGRESS ORDER

TECHNICAL FIELD

This disclosure relates generally to automatically invoking a delivery request while order fulfillment is still in progress.

BACKGROUND

Many customers of retail or grocery stores now desire the convenience of having their orders delivered to their homes and/or picking up their already-collected orders at a designated area of the store. These orders are often made online by the customers using a website or mobile application for the store. A common problem faced by stores, however, is the expense of maintaining freezers or refrigerators to store collected or assembled orders awaiting pickup by delivery drivers and/or the customers. Additionally, it can be difficult for the store to find space to store collected orders and/or separate orders into temperature-controlled portions and non-temperature controlled portions while awaiting pickup.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving an order request from a customer. The order request can comprise (1) an order list of one or more products available for purchase at a store and (2) a delivery address for a delivery of the one or more products of the order list to the customer. The one or more storage modules can be further configured to run on the one or more processing modules and perform an act of transmitting the order list to at least one employee of the store for a collection of the one or more products at the store by the at least one employee. The one or more storage modules can be further configured to run on the one or more processing modules and perform an act of determining an estimated order collection time of when the one or more products of the order list will be collected at the store by the at least one employee. The one or more storage modules can be configured to run on the one or more processing modules and perform an act of continuously monitoring, in real-time, an estimated order pickup time for each delivery driver of one or more delivery drivers of at least one third-party delivery service. The estimated order pickup time for each delivery driver of the one or more delivery drivers can be based at least on a distance of each driver of the one or more delivery drivers from the store. The one or more storage modules can be configured to run on the one or more processing modules and perform an act of, when a first estimated order pickup time for a first delivery driver of the one or more delivery drivers is substantially equal to the estimated order collection time, transmitting a delivery request to the at least one third-party delivery service requesting the first delivery driver of the one or more delivery drivers to pick up the one or more products from the store and deliver the one or more products to the delivery address.

Various embodiments include a method. The method can include receiving an order request from a customer. The order request can comprise (1) an order list of one or more products available for purchase at a store and (2) a delivery address for a delivery of the one or more products of the order list to the customer. The method also can include transmitting the order list to at least one employee of the store for a collection of the one or more products at the store by the at least one employee. The method also can include determining an estimated order collection time of when the one or more products of the order list will be collected at the store by the at least one employee. The method also can include continuously monitoring, in real-time, an estimated order pickup time for each delivery driver of one or more delivery drivers of at least one third-party delivery service. The estimated order pickup time for each delivery driver of the one or more delivery drivers being based at least on a distance of each driver of the one or more delivery drivers from the store. The method also can include, when a first estimated order pickup time for a first delivery driver of the one or more delivery drivers is substantially equal to the estimated order collection time, transmitting a delivery request to the at least one third-party delivery service requesting the first delivery driver of the one or more delivery drivers to pick up the one or more products from the store and deliver the one or more products to the delivery address.

Figure 1:
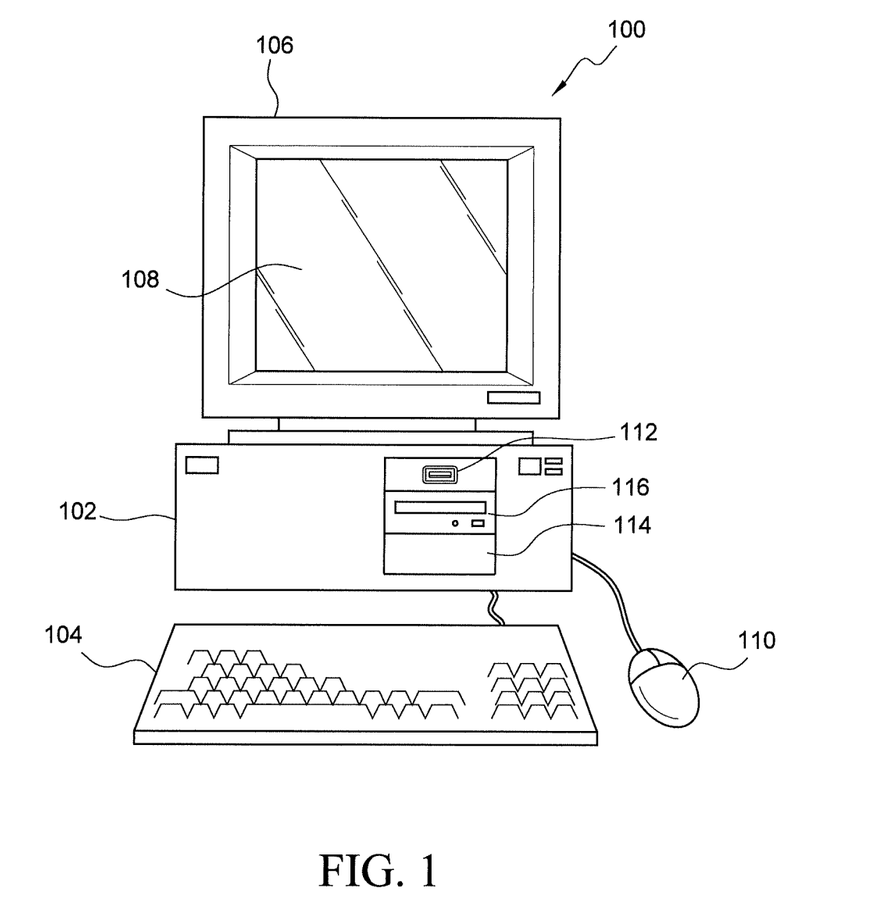
FIG. 1 illustrates a front elevational view of a computer system that is suitable for implementing various embodiments of the systems disclosed in FIGS. 3 and 5.
Figure 2:
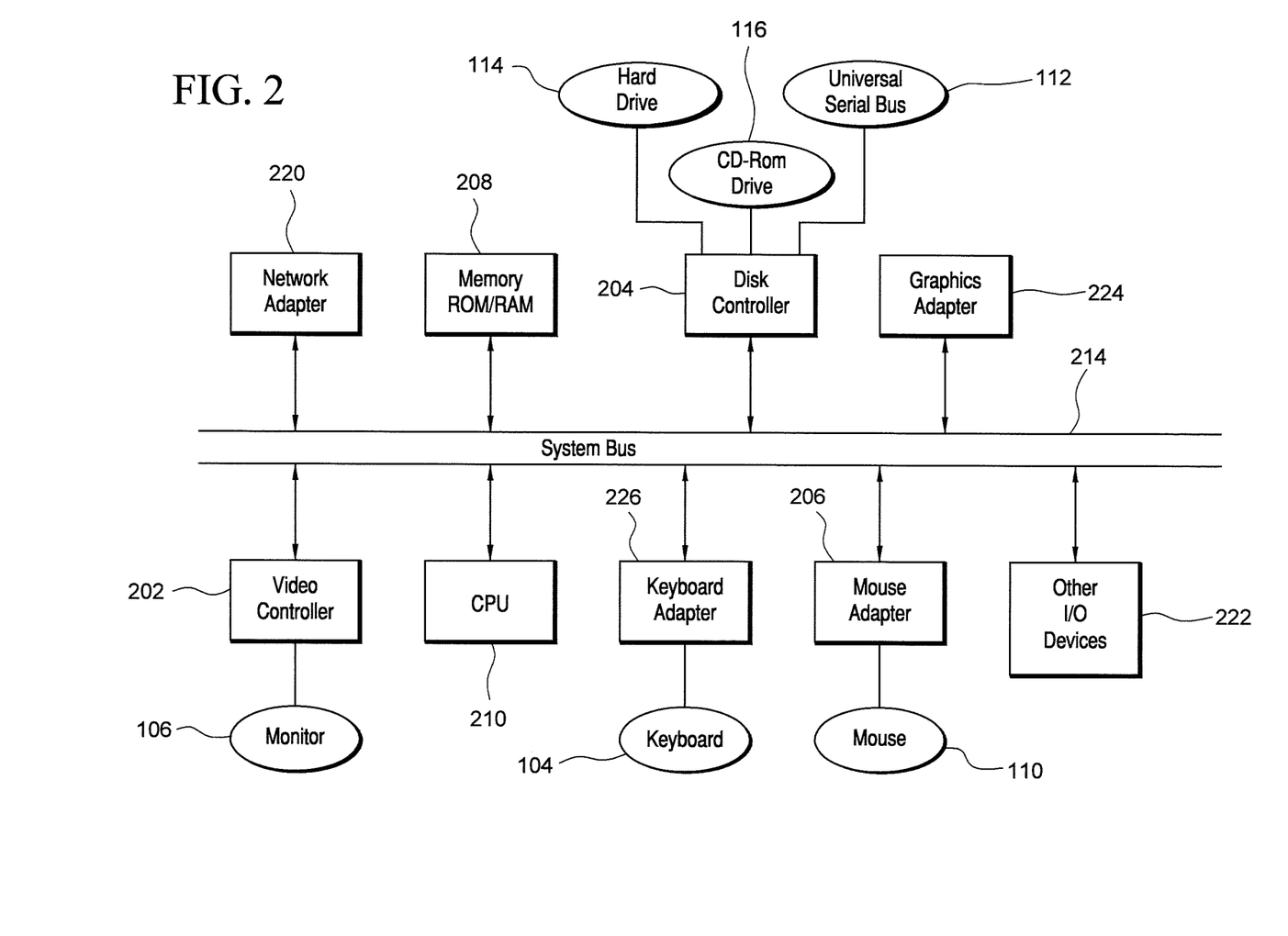
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
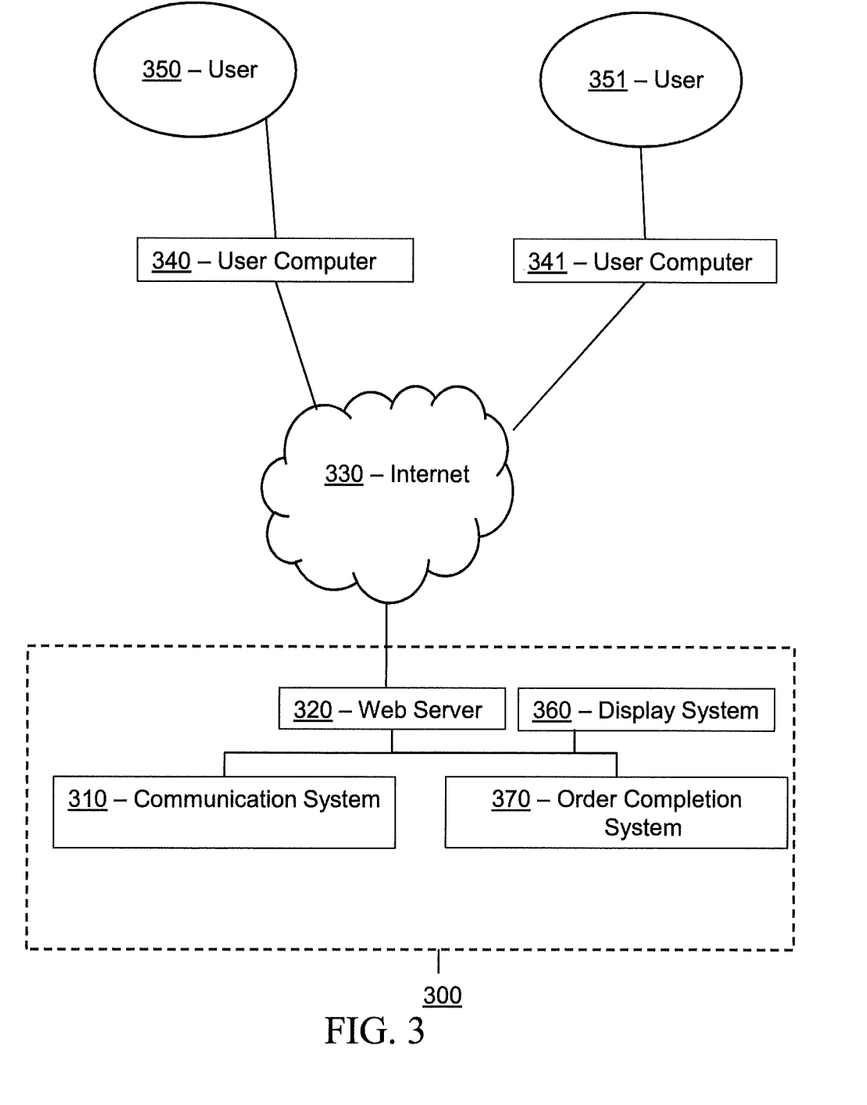
FIG. 3 illustrates a representative block diagram of a system, according to an embodiment.

Turning ahead in the drawings, FIG. 3 illustrates a block diagram of a system 300 that can be employed for automatically invoking a delivery request for an in-progress order, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communication system 310, a web server 320, a display system 360, and an order completion system 370. Communication system 310, web server 320, display system 360, and order completion system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communication system 310, web server 320, display system 360, and/or order completion system 370. Additional details regarding communication system 310, web server 320, display system 360, and order completion system 370 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, communication system 310, web server 320, display system 360, and/or order completion system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communication system 310, web server 320, display system 360, and/or order completion system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communication system 310, web server 320, display system 360, and/or order completion system 370. In a similar manner, the processing module(s) and the memory storage module(s) can be local and/or remote to each other.

In many embodiments, communication system 310, web server 320, display system 360, and/or order completion system 370 can be configured to communicate with one or more user computers 340 and 341. In some embodiments, user computers 340 and 341 also can be referred to as customer computers. In some embodiments, communication system 310, web server 320, display system 360, and/or order completion system 370 can communicate or interface (e.g., interact) with one or more customer computers (such as user computers 340 and 341) through a network or internet 330. Internet 330 can be an intranet that is not open to the public. Accordingly, in many embodiments, communication system 310, web server 320, display system 360, and/or order completion system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communication system 310, web server 320, display system 360, and/or order completion system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communication system 310, web server 320, display system 360, order completion system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
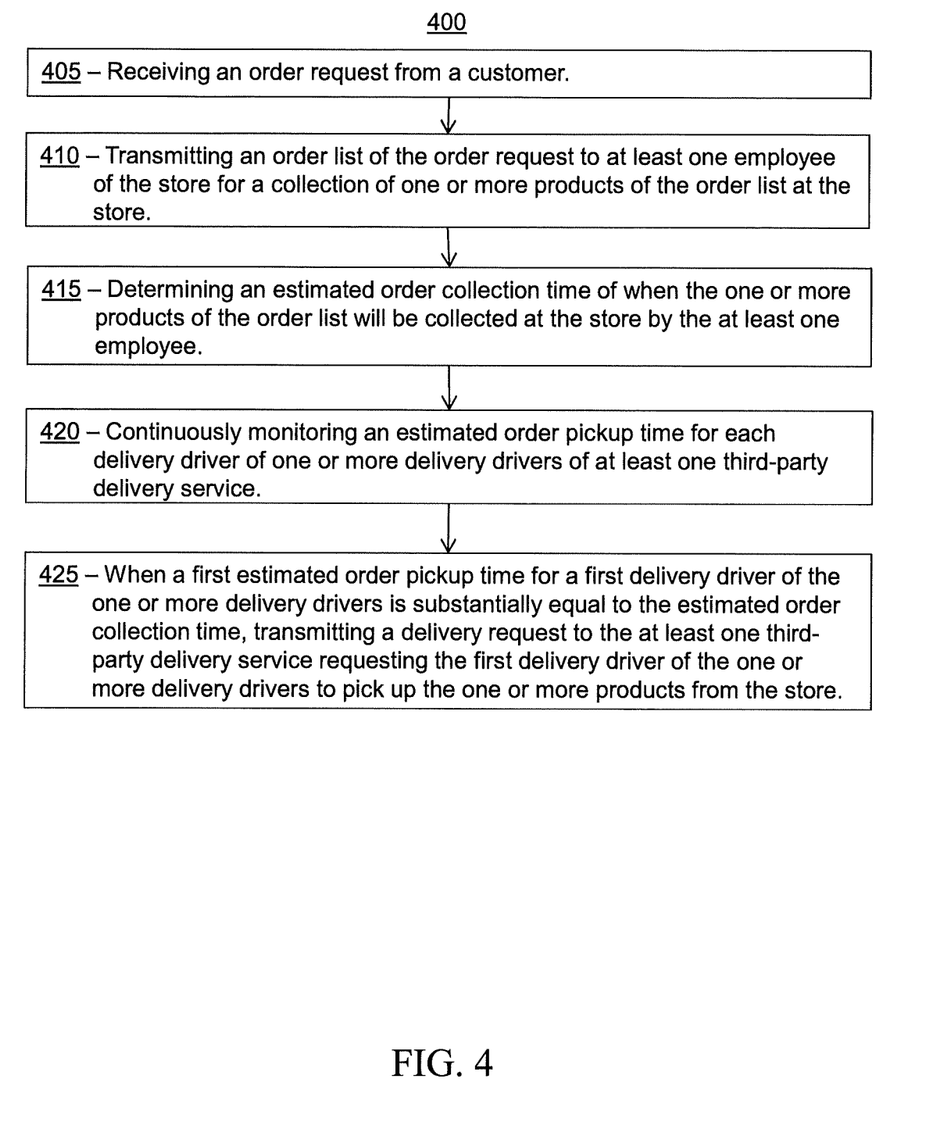
FIG. 4 is a flowchart for a method, according to certain embodiments.
Figure 5:
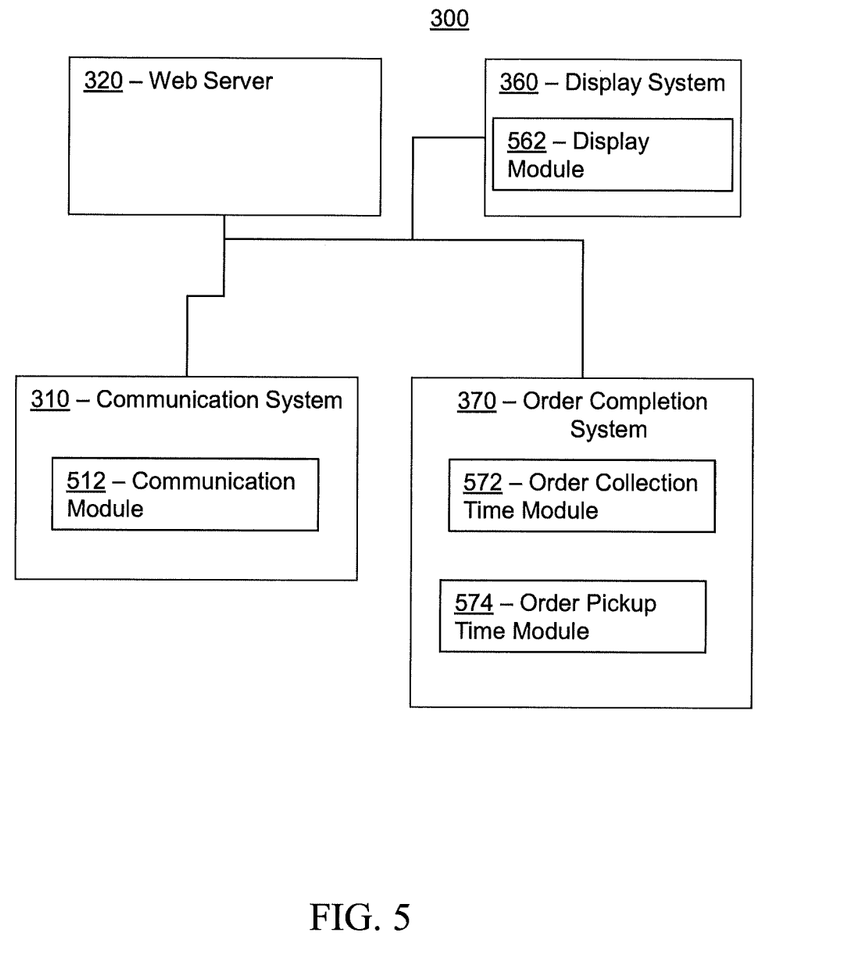
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, and/or 574 (FIG. 5). Such non-transitory memory storage modules can be part of a computer system such as communication system 310, web server 320, display system 360, and/or order completion system 370 (FIGS. 3 & 5). The processing module(s) can be similar or identical to the processing module(s) described above with respect to computer system 100 (FIG. 1).

Many customers of retail or grocery stores now desire the convenience of having their orders delivered to their homes and/or picking up their already-collected orders at a designated area of the store. These orders are often made online by the customers using a website or mobile application for the store. A common problem faced by stores, however, is the expense of maintaining freezers or refrigerators to store collected or assembled orders awaiting pickup by delivery drivers and/or the customers. Additionally, it can be difficult for the store to find space to store collected orders and/or separate orders into temperature-controlled portions and non-temperature controlled portions while awaiting pickup.

To solve this problem, various embodiments of method 400 automatically invoke a delivery request while the order fulfillment (or collection of the order at the store) is still in progress. As shall be described in greater detail below, automatically invoking a delivery request at the correct time while the order is still being collected allows the delivery driver (and possibly the customer) to arrive at the store to pick up the order at essentially the same time as when collection of the order at the store is completed.

Method 400 can comprise an activity 405 of receiving an order request from a customer. In many embodiments, the order request can be made online by a customer visiting a website or a mobile application of a store or retailer on an electronic device. The website or mobile application can be associated with a brick and mortar store, an online store, a warehouse, a distribution center, and/or a fulfillment center, and thus, as used herein, the term "store" can include each of these locations. In many embodiments, the order request can comprise at least one of (1) an order list of one or more products available for purchase at the store, and/or (2) a delivery address for a delivery of the one or more products of the order list to the customer (or for pick up at the store by the customer). For example, when a customer visits or otherwise uses a website or mobile application of the store, the customer can compile an order list of one or more products that are available for purchase at the store. Before or after compiling the order list of the one or more products, the customer can enter a delivery address where the customer would like the one or more products delivered (or can indicate that the customer will pick up the one or more products at the store). In some embodiments, the delivery address can be a default address previously entered with customer information and/or a previous order.

In many embodiments, method 400 and/or activity 405 also can comprise an activity of determining the order request is eligible for the delivery of the one or more products to the delivery address of the customer within a predetermined amount of time from an order request time. Such a determination can take place before or after the customer compiles the order list. For example, in some embodiments, system 300 (FIG. 3) can coordinate displaying an inquiry to the customer before the customer begins shopping, the inquiry asking if the customer would like to make an order request for delivery of one or more products. If the customer selects or otherwise enters that he/she would like to make an order request for delivery of the one or more products, then system 300 (FIG. 3) can coordinate displaying only products eligible for delivery.

In some embodiments, determining the order request is eligible for the delivery of the one or more products to the delivery address of the customer within a predetermined amount of time from an order request time can comprise determining the order request is eligible for the delivery of the one or more products to the delivery address of the customer based on a plurality of factors. This plurality of factors can comprise one or more of (1) a number of products in the order list, (2) a physical size of the one or more products in the order list, (3) a picker availability of the at least one employee of the store for the collection of the one or more products of the order list at the store, (4) a distance of the physical address from the store, and/or (5) a driver availability of the one or more delivery drivers. For example, if the order list is too small or too large, the order request may not be eligible for delivery. By way of another example, if one or more products on the order list are beyond certain size dimensions or weight (that would prevent the one or more products from fitting in a delivery vehicle or be carried by a delivery driver), the order request may not be eligible for delivery.

In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location. In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Once the ordering process is completed by the customer, method 400 also can comprise an activity 410 of transmitting an order list of the order request to at least one employee of the store for a collection of one or more products of the order list at the store by the at least one employee. In many embodiments, activity 410 can comprise transmitting the order list to an electronic device used by the at least one employee of the store for the collection of the one or more products at the store by the at least one employee. The electronic device can be a personal electronic device of the employee or, alternatively, can be an electronic device owned by the store and given to the employee to use at the store.

In many embodiments, method 400 and/or activity 410 also can comprise an activity of coordinating displaying or otherwise generating instructions for providing an interface that displays the order list of the order request on the electronic device of the at least one employee.

Method 400 also can comprise an activity 415 of determining an estimated order collection time of when the one or more products of the order list will be collected at the store by the at least one employee. In many embodiments, the estimated order collection time can be based on one or more of (1) a time of day, (2) the employee collecting the one or more products of the order list, or (3) types of products in the order list. The time of day can affect the pick time estimation due to the store being more or less crowded at certain times of the day. System 300 (FIG. 3) also can determine estimated order collection time based on the historical performance of the employee assigned to collect the one or more products of the order list.

In some embodiments, the estimated order collection time can be determined using a regression analysis for estimating the relationships among variables. The regression analysis used can use the relationship between a dependent variable and one or more independent variables (or "predictors"). The regression model can determine how order collection time (or the dependent variable or "criterion variable") can predict changes when any one of the independent variables is varied for each order. The independent variables can include, for example, a number of: (1) a total number of ambient, chilled, and/or frozen products; and/or (2) a total number of ambient, chilled, and/or frozen products.

In some embodiments, linear regression can be used where the relationships are modeled using linear predictor functions whose unknown model parameters are estimated from data. For example, given a variable y and a number of variables $X_1, \ldots, X_p$ that may be related to y, linear regression analysis can be applied to quantify the strength of the relationship between y and the $X_j$, to assess which $X_j$ may have no relationship with y at all, and to identify which subsets of the $X_j$ contain redundant information about y.

In a non-limiting example, the following was used to determine all values of A based on historical data, and then was used to estimate order collection time based on order related variables:

Estimated Picking Time=$A1X1, A2X2, A3X3, A4X4, A5X5 \ldots AnXn$+Constant+Error where Constant is a required value for each estimation, A are coefficients, and X are order related variables that impact order collection. Independent variables or order related variables that impact order collection time can be determined through techniques of feature selection, and then the independent variables or order related variables to the features that impacted the order collection time the most can be determined. Information gain for feature selection can be used to select features that are most important to order collection time and discard irrelevant or redundant features.

In many embodiments, method 400 and/or activity 415 also can comprise an activity of coordinating displaying or otherwise generating instructions for providing an interface that displays the estimated order collection time on one or more electronic devices. For example, system 300 (FIG. 3) can coordinate displaying the estimated order collection time on the electronic device of the employee collecting the one or more products of the order list, a store administrator located at the store, a store administrator located remotely from the store, the customer for whom the order is being collected, and/or a delivery driver assigned to deliver the one or more products to the customer.

Method 400 also can comprise an activity 420 of continuously monitoring, in real-time, an estimated order pickup time for each delivery driver of one or more delivery drivers of at least one third-party delivery service and/or another delivery service of the store such as an internal delivery source. In many embodiments, the estimated order pickup time at a certain point in time can comprise an estimated time that the delivery driver would arrive at the store if a request for the delivery drive was made at that certain point in time. For example, system 300 (FIG. 3) can continuously monitor, in real-time, the location of a plurality of delivery drivers for a third-party delivery service (and/or another delivery service of the store such as an internal delivery source) to estimate a time at which each of the plurality of delivery drivers would arrive at the store to pick up an order if a request was made at that moment.

In some embodiments, activity 420 can comprise receiving the estimated order pickup time for each delivery driver of the one or more delivery drivers of the at least one third-party delivery service (and/or another delivery service of the store such as an internal delivery source) from the at least one third-party delivery service (and/or another delivery service of the store such as an internal delivery source) at predetermined time intervals. For example, system 300 (FIG. 3) can receive estimated order pickup times for a plurality of drivers for a third-party delivery service (and/or another delivery service of the store such as an internal delivery source) every 30 seconds, 60 seconds, 90 seconds, 2 minutes, 3 minutes, and so on. In some embodiments, system 300 (FIG. 3) continuously monitors or receives updates for each delivery driver of one or more delivery drivers of the third-party delivery service (and/or another delivery service of the store such as an internal delivery source) through an application program interface (API) of the third-party delivery service (and/or another delivery service of the store such as an internal delivery source). The (API) can be configured to provide system 300 (FIG. 3) with a direct connection to the third-party delivery service to allow system 300 (FIG. 3) to continuously monitor the estimated order pickup time for each delivery driver.

In many embodiments, the estimated order pickup time for each delivery driver of the one or more delivery drivers can be based on one or more of a distance of each driver of the one or more delivery drivers from the store, traffic between each delivery driver and the store, a number of the one or more delivery drivers available to pick up the order, and so on. The third-party delivery service can comprise but is not limited to a crowd-sourced delivery service.

In many embodiments, method 400 and/or activity 420 also can comprise an activity of coordinating displaying or otherwise generating instructions for providing an interface that displays the estimated order pickup time for each delivery driver of one or more delivery drivers of at least one third-party delivery service on one or more electronic devices. For example, system 300 (FIG. 3) can coordinate displaying the estimated order pickup time on the electronic device of the employee collecting the one or more products of the order list, a store administrator located at the store, a store administrator located remotely from the store, the customer for whom the order is being collected, and/or a delivery driver assigned to deliver the one or more products to the customer.

In many embodiments, method 400 and/or activity 420 can automatically invoke a delivery request when an estimated order pickup time and an estimated order collection are substantially equal or within a certain range of time. For example, if the estimated pickup time of one of the delivery drivers is within 30 seconds, 60 seconds, 90 seconds, 2 minutes, 3 minutes, and so on, of the order collection time, system 300 can automatically invoke or otherwise transmit a delivery request at an appropriate time. Thus, continuing in FIG. 4, method 400 also can comprise an activity 425 of, when a first estimated order pickup time for a first delivery driver of the one or more delivery drivers is substantially equal to the estimated order collection time, transmitting a delivery request to the at least one third-party delivery service (and/or another delivery service of the store such as an internal delivery source). The delivery request can comprise requesting the first delivery driver of the one or more delivery drivers to pick up the one or more products from the store and deliver the one or more products to the delivery address. In some embodiments, the delivery request is transmitted to the third-party delivery service (and/or another delivery service of the store such as an internal delivery source), which then transmits the delivery request to the first delivery driver. In other embodiments, the delivery request is transmitted to the first delivery driver directly from system 300 (FIG. 3) or through a server system of the third-party delivery service. In many embodiments, the delivery request is accepted by the third-party delivery service based on the ability of the third-party delivery service to fulfill the delivery request to pick up the order at the estimated order pickup time and/or deliver the order during a specified window of time.

In many embodiments, method 400 (and/or activity 425) also can comprise an activity of coordinating displaying or otherwise generating instructions for providing an interface that displays the delivery request on one or more electronic devices. For example, system 300 (FIG. 3) can coordinate displaying the delivery request on the electronic device of the first delivery driver.

In some embodiments, method 400 (and/or activity 425) can optionally comprise an activity of transmitting delivery driver information to at least one employee of the store. The at least one employee of the store can comprise one or more employees of the store assigned to collect the order and/or a manager of the store. The delivery driver information transmitted to the at least one employee of the store can comprise one or more of (1) a name of the delivery driver assigned to pick up and deliver the one or more products, (2) vehicle make and model information for a vehicle being driven by the delivery driver assigned to pick up and deliver the one or more products, and/or (3) a meeting location for transfer of the one or more products from the employee of the store to the delivery driver assigned to pick up and deliver the one or more products.

In some embodiments, method 400 (and/or activity 425) can optionally comprise an activity of coordinating displaying or otherwise generating instructions for providing an interface that displays delivery driver information on one or more electronic devices. For example, system 300 (FIG. 3) can coordinate displaying the delivery driver information on the electronic device of an employee of the store.

In some embodiments, method 400 (and/or activity 425) can optionally comprise an activity of transmitting delivery driver information to the electronic device of the customer. The delivery driver information transmitted to the customer can comprise one or more of (1) a name of the first delivery driver, (2) vehicle make and model information for a vehicle being driven by the first delivery driver, (3) an estimated arrival time of the first delivery driver at the delivery address, and/or (4) tracking information for the first delivery driver.

In many embodiments, method 400 (and/or activity 425) can optionally comprise an activity of coordinating displaying or otherwise generating instructions for providing an interface that displays delivery driver information on the electronic device of the customer.

FIG. 5 illustrates a block diagram of a portion of system 300 comprising communication system 310, web server 320, display system 360, and order completion system 370, according to the embodiment shown in FIG. 3. Each of communication system 310, web server 320, display system 360, and/or order completion system 370, is merely exemplary and not limited to the embodiments presented herein. Each of communication system 310, web server 320, display system 360, and/or order completion system 370, can be employed in many different embodiments or examples not specifically depicted or described herein. In some embodiments, certain elements or modules of communication system 310, web server 320, display system 360, and/or order completion system 370 can perform various procedures, processes, and/or acts. In other embodiments, the procedures, processes, and/or acts can be performed by other suitable elements or modules.

In many embodiments, communication system 310 can comprise non-transitory storage module 512. Memory storage module 512 can be referred to as communication module 512. In many embodiments, communication module 512 can store computing instructions configured to run on one or more processing modules and perform one or more acts of method 400 (FIG. 4) (e.g., activity 405 of receiving an order request from a customer, activity 410 of transmitting an order list of the order request to at least one employee of the store for a collection of one or more products of the order list at the store, and activity 425 of, when a first estimated order pickup time for a first delivery driver of the one or more delivery drivers is substantially equal to the estimated order collection time, transmitting a delivery request to the at least one third-party delivery service requesting the first delivery driver of the one or more delivery drivers to pick up the one or more products from the store (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., coordinating displaying the order list on the electronic device of the employee of the store, coordinating displaying the estimated order collection time on an electronic device of the store, coordinating displaying the estimated order pickup time for each delivery driver of the one or more delivery drivers of the least one third-party delivery service, coordinating displaying the delivery request on an electronic device of the at least one third-party delivery service, coordinating displaying the delivery driver information on the electronic device of the employee of the store, and coordinating displaying the delivery driver information on the electronic device of the customer).

In many embodiments, order completion system 370 can comprise non-transitory memory storage module 572. Memory storage module 572 can be referred to as order collection time module 572. In many embodiments, order collection time module 572 can store computing instructions configured to run on one or more processing modules and perform one or more acts of method 400 (FIG. 4) (e.g. activity 415 of determining an estimated order collection time of when the one or more products of the order list will be collected at the store by the at least one employee (FIG. 4)).

In many embodiments, order completion system 370 can comprise non-transitory memory storage module 574. Memory storage module 574 can be referred to as order pickup time module 574. In many embodiments, order pickup time module 574 can store computing instructions configured to run on one or more processing modules and perform one or more acts of method 400 (FIG. 4) (e.g., activity 420 of continuously monitoring an estimated order pickup time for each delivery driver of one or more delivery drivers of at least one third-party delivery service (FIG. 4)).

Although systems and methods for automatically invoking a delivery request for an in-progress order have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform:
receiving, at the one or more processors, an order request from an electronic device of a customer, the order request comprising (1) an order list of one or more products available for purchase via a computing device at a store and (2) a delivery address for a delivery of the one or more products of the order list to the customer;
causing the order list to be displayed on at least one electronic device of at least one employee of the store, the order list used for a collection of the one or more products at the store by the at least one employee;
determining, (1) at the one or more processors and (2) using employee device data collected from the at least one electronic device of the at least one employee of the store in a regression analysis, an estimated order collection time for the collection of the one or more products of the order list by the at least one employee at the store, wherein the regression analysis is configured to determine when portions of the employee device data have (a) no effect on the estimated order collection time and (b) a redundant effect on the estimated order collection time, and wherein the regression analysis uses:
one or more independent variables affecting the estimated order collection time;
respective coefficients of each respective independent variable of the one or more independent variables affecting the estimated order collection time; and
a constant applicable to the employee device data of the at least one employee of the store;
continuously monitoring, in real-time using (1) the one or more processors and (2) delivery driver data received from at least one electronic device of at least one delivery vehicle, a respective location of each respective delivery driver of one or more delivery drivers of at least one third-party delivery service;
continuously determining a respective estimated order pickup time for each respective delivery driver of the one or more delivery drivers of the at least one third-party delivery service, the respective estimated order pickup time for each respective delivery driver of the one or more delivery drivers being based on at least a respective distance of each respective delivery driver of the one or more delivery drivers from the store; and
when a first estimated order pickup time for a first delivery driver of the one or more delivery drivers is approximately equal to the estimated order collection time, causing a delivery request to be displayed on at least one electronic device of the at least one third-party delivery service via a server system of the at least one third-party delivery service, the delivery request instructing the first delivery driver of the one or more delivery drivers to pick up the one or more products from the store and deliver the one or more products to the delivery address.

2. The system of claim 1, wherein the one or more non-transitory storage devices storing the computing instructions are further configured to run on the one or more processors and perform:
determining when the order request is eligible for the delivery of the one or more products to the delivery address of the customer within a predetermined amount of time from an order request time.

3. The system of claim 2, wherein determining when the order request is eligible for the delivery of the one or more products to the delivery address of the customer within the predetermined amount of time from the order request time comprises determining when the order request is eligible for the delivery of the one or more products to the delivery address of the customer based on one or more of:
(1) a number of the one or more products in the order list;
(2) a physical size of the one or more products in the order list;
(3) a picker availability of the at least one employee of the store for the collection of the one or more products of the order list at the store;
(4) a distance of the delivery address from the store; or
(5) a respective driver availability of each respective delivery driver of the one or more delivery drivers.

4. The system of claim 1, wherein the estimated order collection time is based on one or more of:
(1) a time of day;
(2) the at least one employee collecting the one or more products of the order list; or
(3) types of the one or more products in the order list.

5. The system of claim 1, wherein the one or more non-transitory storage devices storing the computing instructions are further configured to run on the one or more processors and perform:
transmitting delivery driver information to the at least one electronic device of the at least one employee of the store, the delivery driver information comprising one or more of:
(1) a name of the first delivery driver;
(2) vehicle make and model information for a vehicle being driven by the first delivery driver; or
(3) a meeting location for transfer of the one or more products from the at least one employee of the store to the first delivery driver.

6. The system of claim 1, wherein continuously monitoring, in real-time, the respective location of each respective delivery driver of the one or more delivery drivers of the at least one third-party delivery service comprises:
receiving the respective location of each respective delivery driver of the one or more delivery drivers of the at least one third-party delivery service from the at least one electronic device of the at least one delivery vehicle at predetermined time intervals.

7. The system of claim 1, wherein the one or more non-transitory storage devices storing the computing instructions are further configured to run on the one or more processors and perform:
transmitting delivery driver information to the electronic device of the customer, the delivery driver information comprising one or more of:
(1) a name of the first delivery driver;
(2) vehicle make and model information for a vehicle being driven by the first delivery driver;
(3) an estimated arrival time of the first delivery driver at the delivery address; or
(4) tracking information for the first delivery driver.

8. A method being implemented via execution of computing instructions configured to run at one or more processors and configured to be stored at non-transitory computer-readable media, the method comprising:
receiving, at the one or more processors, an order request from an electronic device of a customer, the order request comprising (1) an order list of one or more products available for purchase via a computing device at a store and (2) a delivery address for a delivery of the one or more products of the order list to the customer;
causing the order list to be displayed on at least one electronic device of at least one employee of the store, the order list used for a collection of the one or more products at the store by the at least one employee;
determining, (1) at the one or more processors and (2) using employee device data collected from the at least one electronic device of the at least one employee of the store in a regression analysis, an estimated order collection time for the collection of the one or more products of the order list by the at least one employee at the store, wherein the regression analysis is configured to determine when portions of the employee device data have (a) no effect on the estimated order collection time and (b) a redundant effect on the estimated order collection time, and wherein the regression analysis uses:
one or more independent variables affecting the estimated order collection time;
respective coefficients of each respective independent variable of the one or more independent variables affecting the estimated order collection time; and
a constant applicable to the employee device data of the at least one employee of the store;
continuously monitoring, in real-time using (1) the one or more processors and (2) delivery driver data received from at least one electronic device of at least one delivery vehicle, a respective location of each respective delivery driver of one or more delivery drivers of at least one third-party delivery service;
continuously determining a respective estimated order pickup time for each respective delivery driver of the one or more delivery drivers of the at least one third-party delivery service, the respective estimated order pickup time for each respective delivery driver of the one or more delivery drivers being based on at least a respective distance of each respective delivery driver of the one or more delivery drivers from the store; and
when a first estimated order pickup time for a first delivery driver of the one or more delivery drivers is approximately equal to the estimated order collection time, causing a delivery request to be displayed on at least one electronic device of the at least one third-party delivery service via a server system of the at least one third-party delivery service, the delivery request instructing the first delivery driver of the one or more delivery drivers to pick up the one or more products from the store and deliver the one or more products to the delivery address.

9. The method of claim 8, further comprising determining when the order request is eligible for the delivery of the one or more products to the delivery address of the customer within a predetermined amount of time from an order request time.

10. The method of claim 9, wherein determining when the order request is eligible for the delivery of the one or more products to the delivery address of the customer within the predetermined amount of time from the order request time comprises determining when the order request is eligible for the delivery of the one or more products to the delivery address of the customer based on one or more of:

(1) a number of the one or more products in the order list;
(2) a physical size of the one or more products in the order list;
(3) a picker availability of the at least one employee of the store for the collection of the one or more products of the order list at the store;
(4) a distance of the delivery address from the store; or
(5) a respective driver availability of each respective delivery driver of the one or more delivery drivers.

11. The method of claim 8, wherein the estimated order collection time is based on one or more of:
(1) a time of day;
(2) the at least one employee collecting the one or more products of the order list; and
(3) types of the one or more products in the order list.

12. The method of claim 8, further comprising:
transmitting delivery driver information to the at least one electronic device of the at least one employee of the store, the delivery driver information comprising one or more of:
(1) a name of the first delivery driver;
(2) the at least one employee collecting the one or more products of the order list; or
(3) a meeting location for transfer of the one or more products from the at least one employee of the store to the first delivery driver.

13. The method of claim 8, wherein continuously monitoring, in real-time, the respective location of each respective delivery driver of the one or more delivery drivers of the at least one third-party delivery service comprises:
receiving the respective location of each respective delivery driver of the one or more delivery drivers of the at least one third-party delivery service from the at least one electronic device of the at least one delivery vehicle at predetermined time intervals.

14. The method of claim 8, further comprising:
transmitting delivery driver information to the electronic device of the customer, the delivery driver information comprising one or more of:
(1) a name of the first delivery driver;
(2) vehicle make and model information for a vehicle being driven by the first delivery driver;
(3) an estimated arrival time of the first delivery driver at the delivery address; or
(4) tracking information for the first delivery driver.

15. The system of claim 1, wherein the employee device data comprises at least one of a quantity of ambient temperature items in the order list, a quantity of chilled items in the order list, or a quantity of frozen items in the order list.

16. The method of claim 8, wherein the employee device data comprises at least one of a quantity of ambient temperature items in the order list, a quantity of chilled items in the order list, or a quantity of frozen items in the order list.

17. The system of claim 1, wherein the regression analysis is further configured to generate an equation for calculating the estimated order collection time, the equation comprising:

$$T = A1X1, A2X2, A3X3, \ldots AnXn + C + E, \text{ where:}$$

A comprises the respective coefficients of each respective independent variable;
X comprises the one or more independent variables;
C comprises the constant applicable to the employee device data of the at least one employee of the store; and
E comprises an error term.

18. The method of claim 8, wherein the regression analysis is further configured to generate an equation for calculating the estimated order collection time, the equation comprising:

$$T = A1X1, A2X2, A3X3, \ldots AnXn + C + E, \text{ where:}$$

T comprises the estimated order collection time

A comprises the respective coefficients of each respective independent variable;

X comprises the one or more independent variables;

C comprises the constant applicable to the employee device data of the at least one employee of the store; and E comprises an error term.

19. The system of claim 1, wherein the one or more non-transitory storage devices storing the computing instructions are further configured to run on the one or more processors and perform:

before receiving, at the one or more processors, the order request from the electronic device of the customer, causing the electronic device of the customer to display an inquiry asking whether the order request is a delivery request; and when the order request is the delivery request, causing the electronic device of the customer to display only delivery eligible products.

20. The method of claim 8 further comprising:

before receiving, at the one or more processors, the order request from the electronic device of the customer, causing the electronic device of the customer to display an inquiry asking whether the order request is a delivery request; and when the order request is the delivery request, causing the electronic device of the customer to display only delivery eligible products.

* * * * *